United States Patent [19]

Adachi et al.

[11] 4,165,415
[45] Aug. 21, 1979

[54] METHOD FOR PREPARATION OF A FOAM OF CHLORINATED VINYL CHLORIDE POLYMER EMPLOYING A LOWER ALIPHATIC ALCOHOL FOAMING AGENT

[75] Inventors: Terufumi Adachi; Michifumi Tanga, both of Shinnan'yo, Japan

[73] Assignee: Tokuyama Sekishi Kogyo Kabushiki Kaisha, Osaka, Japan

[21] Appl. No.: 736,595

[22] Filed: Oct. 28, 1976

[30] Foreign Application Priority Data

Nov. 5, 1975 [JP] Japan .................. 50-133401

[51] Int. Cl.² .............................................. C08J 9/00
[52] U.S. Cl. .................................... 521/145; 264/51; 264/53; 264/55; 264/DIG. 5
[58] Field of Search ................. 260/2.5 P; 521/145

[56] References Cited

U.S. PATENT DOCUMENTS

| | | | |
|---|---|---|---|
| 3,243,485 | 3/1966 | Griffin | 260/2.5 HB |
| 3,366,580 | 1/1968 | Kraemer et al. | 260/2.5 R |
| 3,975,315 | 8/1976 | Parks | 260/2.5 HB |
| 3,976,605 | 8/1976 | Matsunaga et al. | 260/2.5 HB |

FOREIGN PATENT DOCUMENTS 7004596 10/1970 Netherlands .
1297533 11/1972 United Kingdom .

OTHER PUBLICATIONS

Chem. Absts. 80(1974): 15867p, "Foamable Polystyre Pellets", Hattori et al.
Chem. Absts. 82(1975) 172155p, "Thermoplastic Resin Foams", Nakae et al.

*Primary Examiner*—Edward M. Woodberry
*Attorney, Agent, or Firm*—Armstrong, Nikaido, Marmelstein & Kubovcik

[57] ABSTRACT

A method for preparing foams of chlorinated vinyl chloride polymers is provided. The foams are prepared by impregnating the chlorinated vinyl chloride polymer with an aliphatic alcohol of from 1 to 5 carbon atoms and thereafter heating the impregnated polymer.

8 Claims, No Drawings

METHOD FOR PREPARATION OF A FOAM OF CHLORINATED VINYL CHLORIDE POLYMER EMPLOYING A LOWER ALIPHATIC ALCOHOL FOAMING AGENT

BACKGROUND OF THE INVENTION

1. Field of the Invention

This invention relates to a method for preparing a foam of chlorinated polymer of vinyl chloride.

2. Description of the Prior Art

Foams of chlorinated polymers of vinyl chloride have good heat resistance when compared to foams of the non-chlorinated polymers of vinyl chloride. More particularly, foams of chlorinated vinyl chloride polymers have a small coefficient of contraction at high temperatures and can withstand the high temperatures, and therefore can be used for applications in which the foam is contacted with hot water or steam pipes for heat insulation. Furthermore, the foam of the chlorinated polymer is superior in non-inflammability and is suitable for use as construction materials. Moreover, the foam of the chlorinated polymer is superior in mechanical strength and in electrical insulation properties. The foam of the chlorinated polymer also has excellent chemical resistance, and can be used in apparatus for the chemical industry. It is expected, therefore, that the foam of the chlorinated chloride polymer will be used in wide variety of applications.

There is, however, no known satisfactory process for manufacturing a foamed article of a chlorinated polymer of vinyl chloride. For example, U.S. Pat. No. 3,366,580, discloses a process wherein a chlorinated polymer of vinyl chloride is impregnated with halogenated hydrocarbons as the foaming agent, and is then heated to obtain a foamed product.

The process, however, has many drawbacks. Firstly, the resulting product is inferior in heat resistance. The reason for this is believed to be that the halogenated hydrocarbons have an excellent affinity for the chlorinated vinyl chloride polymer and a large amount of the halogenated hydrocarbons is liable to be retained in the foamed product. The halogenated hydrocarbons remaining in the foamed product act as plasticizers when exposed to high temperatures. The foamed product, therefore, is inferior in heat resistance. Since a chlorinated polymer of vinyl chloride is superior to a non-chlorinated polymer of vinyl chloride with respect to heat resistance, and since this is one of the main characteristics of the chlorinated polymer of vinyl chloride, it is to be understood that it is a significant drawback of the chlorinated polymer of vinyl chloride that the heat resistance is deteriorated after the chlorinated polymer has been foamed.

Secondly, the halogenated hydrocarbons have, in general, a high toxicity and pollute the working environment. Furthermore, the halogenated hydrocarbons, when heated, decompose to generate a halogen and a hydrogen halide which also pollute the working environment or attack the apparatus used therein.

Thirdly, the process gives a foamed article that has inferior heat stability and is liable to discolor when exposed to high temperatures.

The above-mentioned drawbacks are all due to the fact that halogenated hydrocarbons are used as the foaming agent for the chlorinated polymer of vinyl chloride.

The inventors tried to improve or avoid these drawbacks and found that a resin foam could be obtained having fine closed cells, when an alcohol having from 1 to 5 carbon atoms was used for the foaming agent. The inventors also determined that alcohols having 1 to 5 carbon atoms are superior in foaming property to halogenated hydrocarbons, and that the alcohols are advantageous in that they do not deteriorate the heat-resistance and heat stability of the chlorinated polymer foam and have, in general, a low toxicity.

SUMMARY OF THE INVENTION

According to the present invention a method for preparing a foamed article of a chlorinated polymer of vinyl chloride is provided which comprises impregnating a chlorinated polymer of vinyl chloride with from 1 to 50 parts by weight, based on 100 parts by weight of the polymer, of alcohol having 1 to 5 carbon atoms, the chlorinated polymer having a chlorine content of between 60 and 75% by weight; and heating to foam the impregnated polymer.

DESCRIPTION OF PREFERRED EMBODIMENTS

According to the present invention, the terminology "chlorinated polymer of vinyl chloride", or "chlorinated vinyl chloride polymer", is intended to refer to products obtained by post-chlorinating a polymer of vinyl chloride. The polymer of vinyl chloride referred to herein includes both homopolymers of vinyl chloride and copolymers of vinyl chloride. The copolymers include copolymers and graftpolymers containing more than about 90% by weight of vinyl chloride, and which are prepared by copolymerizing vinyl chloride with one or more monomers capable of copolymerizing with the vinyl chloride, or by grafting vinyl chloride to a suitable polymer. Monomers capable of copolymerizing with vinyl chloride include vinyl or vinylidine monomers such as ethylene, propylene, vinyl acetate, styrene, acrylonitrile and vinylidene chloride.

Post-chlorination of the polymer of vinyl chloride may be carried out according to methods known in the art. For example, it may be carried out by a suspension chlorination method in which a polymer of vinyl chloride is suspended in an aqueous solution in a closed vessel provided with a stirrer. Oxygen in the vessel is replaced by an inert gas and thereafter chlorine is introduced into the suspension while the suspension is irradiated with ultraviolet rays. Alternatively, the chlorination reaction may be carried out by a solution chlorination method in which the polymer is dissolved in a medium containing a solvent for the polymer, the solvent being a halogenated organic compound such as chloroform or carbon tetrachloride, and chlorine is introduced into the solution to carry out the chlorination reaction while the polymer is dissolved in the solvent. Furthermore, the chlorination may be carried out by a gas phase chlorination method in which a powdery polymer of vinyl chloride is fluidized in gaseous chlorine or a gaseous mixture of chlorine and air, and the polymer chlorinated while being irradiated with ultraviolet rays.

The chlorinated polymer of vinyl chloride thus obtained is preferably a white powder having an average particle size of about 100 microns and an average polymerization degree, or degree of polymerization, of between about 100 and 2000. If the chlorinated polymer has an average polymerization degree of less than 100, it does not exhibit good physical properties, and if it has an average polymerization degree of more than about 2000, it is difficult to foam because of a very high viscosity when molten. Most preferably, the chlorinated polymer has an average polymerization degree of between about 300 and 1000.

It is required that the chlorinated polymer of vinyl chloride employed according to the present invention have a chlorine content of more than about 60% by weight. When the chlorinated polymer has such a chlorine content, a product can be obtained after foaming having uniform and fine cells. In general, when the chlorinated polymer has a high chlorine content, the polymer is progressively improved in heat resistance as well as in its foaming property. On the other hand, if the chlorine content is too great, it is difficult to heat and melt the polymer. Additionally, a long period of time is required to chlorinate the polymer. It is not economical, therefore, to use a polymer having a high chlorine content. Accordingly, a chlorinated polymer having a chlorine content of less than about 75% by weight is typically employed. Among these, use is preferably made of a polymer having a chlorine content of between about 65 and 72% by weight.

Alcohols containing 1 to 5 carbon atoms are used as the foaming agent according to the invention. Included, for example, are the monohydric alcohols such as methyl alcohol, ethyl alcohol, propyl alcohol, iso-propyl alcohol, butyl alcohol, sec-butyl alcohol, tert-butyl alcohol, iso-butyl alcohol, amyl alcohol, sec-amyl alcohol, tert-amyl alcohol, iso-amyl alcohol, 2-methyl-1-butanol, and 3-methyl-2-butanol. Among these alcohols ethyl alcohol is preferred. The alcohols may be used alone or in the form of mixtures. The alcohols may act as softening agents for the polymer. Alcohols of more than six carbon atoms generally have high boiling points and tend to remain in the polymer foams in large amounts, and are not suitable, therefore, for preparing polymer foams having fine, uniform cells.

The foaming agent is used in amounts of between about 1 to 50 parts by weight per 100 parts by weight of the chlorinated polymer of vinyl chloride. If the foaming agent is employed in an amount of less than about 1 part by weight, it does not give a sufficient foaming action. If the foaming agent is used in an amount of more than about 50 parts by weight, it does not produce a polymer foam having good heat resistance because the foaming agent is not completely removed by evaporation and remains in the foam in a large amount. The foaming agent is preferably used in an amount of between 5 to 20 parts by weight.

Various additives may be incorporated in the polymer in addition to the foaming agent. For example, known nucleating agents may be incorporated into the polymer in order to produce uniform cells. As the nucleating agents, there may be employed fine powders of calcium carbonate, calcium sulfate, silica, and fired clays. The nucleating agents are preferably used in an amount of between about 5 to 50 parts by weight per 100 parts by weight of the chlorinated polymer of vinyl chloride, and most preferably in an amount of between 10 to 20 parts by weight. If the nucleating agent is used in a large amount, it gives rise to a brittle polymer foam, and conversely if the nucleating agent is used in a little amount, it does not produce a noticeable effect.

When the chlorinated polymer impregnated with the foaming agent is heated in a closed mold as described below, it is not required to use either a stabilizer or a lubricant because the foaming agent, i.e., the alcohol of 1 to 5 carbons, acts as a heat stabilizer for the polymer, and a white foamed article can be obtained. In contrast, if a halogenated hydrocarbon is used as the foaming agent, the foamed article will have a yellow color if a stabilizer is not used. It is to be noted, however, that when the chlorinated polymer impregnated with a foaming agent according to the present invention is foamed in an extruder, a long time is required to heat the polymer and a heat stabilizer is preferably used. The conventional stabilizers and lubricants may be used such as, for example, dibasic lead sulfate and dibutyl tin laurate.

Other additives may also be added to the polymers including pigments, glass fibers, and resins other than the chlorinated polymer of vinyl chloride such as, for example, methyl methacrylate-butadiene-styrene copolymers, acrylonitrile-butadiene-styrene copolymers and the like. If these other additives are incorporated in very large amounts, they tend to prevent the resin from being foamed. Thus they are preferably incorporated in an amount of between about 5 to 30 parts by weight based on 100 parts by weight of the chlorinated polymer.

Various known methods can be employed for impregnating the powdery chlorinated polymer of vinyl chloride with the foaming agent. For example, the foaming agent may be mixed with a powder or with pellets of the chlorinated polymer of vinyl chloride at an ordinary, i.e., ambient temperature and pressure, and the resulting mixture placed in a closed vessel at the ordinary temperature for a period sufficient to impregnate the polymer with the foaming agent. A second method is to feed the powder or pellets into an extruder where they are heated and kneaded in the presence of the foaming agent to impregnate the polymer. A third method is to mix the foaming agent with a powder or pellets of the chlorinated polymer at an ordinary temperature, and to heat the resulting mixture under pressure in a closed vessel. Among these methods, the first mentioned method is most advantageous from a point of economics. The chlorinated polymer can be impregnated easily with the alcohols even at ordinary temperatures and pressures, because the alcohols are less volatile as compared to the known foaming agents.

In order to foam the chlorinated polymer of vinyl chloride containing the foaming agent, the polymer is placed, for example, in a closed mold, and heated and pressed, or compressed, at a temperature at which the polymer is molten or begins to be fused together, for example, at a temperature of between about 160 and 210° C. for several minutes. Pressing assists in the mutual fusion of the polymer particles and accordingly in forming an integral polymer foam. Thereafter, when the mold is opened, either gradually or abruptly, a polymer foam is obtained having uniform and fine closed cells.

Alternatively, the polymer foam may be prepared by continuously extruding the polymer containing the foaming agent from an extruder. In this instance, the extruder is preferably adjusted in such a manner that the vicinity of the hopper is maintained at a low temperature, preferably less than about 50° C., the forward portion of the extruder cylinder is maintained at a higher temperature, preferably, of between about 100° and 150° C., and the die is maintained at a temperature of between about 130° and 200° C. By adjusting the temperature in this manner, a polymer foam can be continuously obtained having a number of fine, uniform closed cells. The chlorinated polymer of vinyl chloride may be impregnated with the foaming agent beforehand or may be impregnated at a desired position in the extruder.

The foam of the clorinated polymer of vinyl chloride obtained according to the present invention is excellent in heat-resistance, non-inflammability and insulating properties. Furthermore, according to the present invention, the polymer foam can be obtained economically.

The method according to the present invention may be understood more fully by referring to the following working examples wherein foams prepared according to the method of the invention are compared to foams obtained according to the known methods. In the examples all parts are by weight unless otherwise specified. Shrinking ratios, solvent remaining ratios and average polymerization degrees were measured as described below:

(1) Shrinking Ratio

A specimen 10 mm in width and 100 mm in length is cut from a polymer foam of 5 mm thickness. The specimen is placed in a thermostat at 20° C. for 3 hours, after which the length is measured by means of a slide caliper. This value is the length before heating. The specimen is then heated for 3 hours in a thermostat wherein air at 120° C. is circulated. After cooling for 3 hours in a thermostat at 20° C., the length is again measured. This value is the length after heating. The shrinking ratio is calculated by the following formula:

$$\text{Shrinking Ratio (\%)} = \frac{\left(\begin{array}{c}\text{length before}\\ \text{heating}\end{array}\right) - \left(\begin{array}{c}\text{length after}\\ \text{heating}\end{array}\right)}{\left(\begin{array}{c}\text{length before}\\ \text{heating}\end{array}\right)} \times 100$$

Generally, the lower the chlorine content of the chlorinated polymer of vinyl chloride, the higher the shrinking ratio.

(2) Solvent Remaining Ratio

A specimen of 100 mm × 100 mm is cut from a polymer foam board 5 mm in thickness immediately after the foam has been prepared. The specimen is placed for 3 hours in a thermostat at 20° C. and is thereafter weighed. This value is the weight before volatilization. Then the specimen is heated for 12 hours in a thermostat wherein hot air at 140° C. is circulated, after which the specimen is cooled for 3 hours in a thermostat at 20° C. The cooled specimen is then weighed to obtain the weight after volatilization. The solvent remaining ratio is calculated by the following formula:

$$\text{Solvent Remaining Ratio (\%)} = \frac{\left(\begin{array}{c}\text{weight before}\\ \text{volatilization}\end{array}\right) - \left(\begin{array}{c}\text{weight after}\\ \text{volatilization}\end{array}\right)}{\left(\begin{array}{c}\text{weight before}\\ \text{volatilization}\end{array}\right)} \times 100$$

(3) Average Polymerization Degree

The average polymerization degree is measured by the method of JIS K-6721 (Japanese Industrial Standard).

EXAMPLE I (a) 45 Kg of a powdery polyvinyl chloride having an average polymerization degree of 1000, and an average particle size of 200μ and 180 kg of pure water were charged in a glass lined reaction vessel having a capacity of 300 liter and provided with a jacket and stirrer rotated at 300 rpm. to form a suspension in the vessel. Nitrogen gas was introduced into the vessel to replace the air in the vessel while the stirrer was rotated. During this time, hot water was passed through the jacket to maintain the inside of the vessel at 50° C. Then chlorine gas was introduced into the suspension to saturate the suspension. Thereafter, the suspension was irradiated with ultraviolet rays to carry out the chlorination reaction. Meanwhile, the amount of chlorine introdued into the vessel was adjusted so that the suspension was always saturated with the chlorine and one tenth of the amount of the introduced chlorine was discharged from the vessel. After the chlorination reaction had been carried out for 16 hours, the polyvinyl chloride had a chlorine content of 70% by weight. Irradiation of the ultraviolet rays and introduction of the chlorine gas were then stopped, and thereafter nitrogen gas was introduced into the vessel to replace the chlorine gas. The suspension was then filtered, and hydrogen chloride formed in the suspension diluted by water and then neutralized by the addition of a dilute aqueous solution of sodium hydroxide. The solids portion was isolated from the suspension by centrifuge, washed with water, dewatered, and dried to obtain a chlorinated polyvinyl chloride having an average polymerization degree of 620.

(b) 10 Parts of calcium carbonate and 10 parts of ethyl alcohol were added to 100 parts of the chlorinated polyvinyl chloride obtained in (a) and the resulting mixture was placed in a mold cavity having the dimensions: 50 mm × 50 mm × 1 mm (thickness). The mold was heated to the temperature of 180° C. for 3 minutes under a pressure of 100 kg/cm² (Gauge). Immediately thereafter, the pressure was abruptly released to obtain a white polymer foam having a density of 0.056 g/cc and fine uniform cells which were not communicated each other, i.e., closed cells. The foam had a solvent remaining ratio of 0.73% and a shrinking ratio of 0.30%.

COMPARATIVE EXAMPLE I

The chlorinated polyvinyl chloride obtained in Example I(a) was used in this example. In order to foam the chlorinated polyvinyl chloride, the same operations were conducted as in Example I(b), with the exception that 10 parts of dichloroethylene were used as the foaming agent instead of 10 parts of ethyl alcohol. As a result, a polymer foam was obtained having a density of 0.350 g/cc and a yellowish color. The foam had a solvent remaining ratio of 4.00% and a shrinking ratio of 1.50%.

COMPARATIVE EXAMPLE II

The chlorinated polyvinyl chloride obtained in Example I(a) was used without further treatment. In order to foam the chlorinated polyvinyl chloride, the same operations were conducted as in Example I(b), with the exception that 10 parts of trichloromonofluoromethane were used as the foaming agent instead of 10 parts of ethyl alcohol. As a result, a polymer foam was obtained having a density of 0.1 g/cc and a yellowish color. The foam had a solvent remaining ratio of 3.5% and a shrinking ratio of 1.3%.

From the results described above, it was found that the foam obtained according to the present invention had a lower shrinking ratio and a lower solvent remaining ratio than a corresponding foam obtained according to conventional methods. Additionally, it was also determined that the foam obtained according to the present invention was not colored or deteriorated in heat stability as compared to the foams obtained according to the conventional methods.

EXAMPLE II

In this example, the chlorinated polyvinyl chloride obtained in Example I(a) was used as the raw material resin without any further treatment. In order to foam the chlorinated polyvinyl chloride, the same operations were conducted as in Example I(b), with the exception that 10 parts of methyl alcohol were used as the foaming agent instead of 10 parts of ethyl alcohol. As a result, a foamed article was obtained having a density of 0.093 g/cc. The foamed article had a solvent remaining ratio of 0.75% and a shrinking ratio of 0.24%.

EXAMPLE III

Employing the chlorinated polyvinyl chloride obtained in Example I(a), identical operations were conducted as in Example I(b), with the exception that 10 parts of amyl alcohol were used instead of the 10 parts of ethyl alcohol. As a result, a foamed article was obtained having a density of 0.531 g/cc. The foamed article had a solvent remaining ratio of 1.50% and a shrinking ratio of 0.90%.

EXAMPLE IV (a) Chlorinated polyvinyl chloride having an average polymerization degree of 150 and a chlorine content of 75% by weight was obtained by carrying out a chlorination reaction in the same manner as that of Example I(a), with the exception that the reaction time was 50 hours.

(b) The chlorinated polyvinyl chloride obtained in (a) was foamed in the manner of Example I(b) to obtain a foamed article. The foamed article had a density of 0.263 g/cc, a solvent remaining ratio of 0.96% and a shrinking ratio of 0.47%.

EXAMPLE V (a) Chlorinated polyvinyl chloride having an average polymerization degree of 370 and a chlorine content of 73% by weight was obtained by carrying out a chlorination reaction in the same manner as that of Example I(a), with the exception that the reaction time was 30 hours.

(b) The chlorinated polyvinyl chloride obtained in (a) was foamed in the manner of Example I(b) to obtain a foamed article which had a density of 0.130 g/cc, a solvent remaining ratio of 0.81% and a shrinking ratio of 0.47%.

EXAMPLE VI (a) Chlorinated polyvinyl chloride having an average polymerization degree of 740 and a chlorine content of 67% by weight was obtained by carrying out a chlorination reaction in the same manner as that of Example I(a), with the exception that the reaction time was 10 hours.

(b) The chlorinated polyvinyl chloride of (a) was foamed in the manner of Example I(b) to obtain a foamed article. The foamed article had density of 0.036 g/cc, a solvent remaining ratio of 0.85% and a shrinking ratio of 0.30%.

EXAMPLE VII (a) Chlorinated polyvinyl chloride having an average polymerization degree of 860 and a chlorine content of 64% was obtained by carrying out a chlorination reaction as described in Example I(a), but employing a reaction time of 6 hours.

(b) The chlorinated polyvinyl chloride obtained in (a) was foamed according to the manner of Example I(b) to obtain a foamed article having a density of 1.104 g/cc, a solvent remaining ratio of 0.80% and a shrinking ratio of 0.56%.

EXAMPLE VIII (a) Chlorinated polyvinyl chloride was obtained by carrying out the chlorination reaction of Example I(a), but employing a reaction time of 3 hours. The chlorinated polyvinyl chloride had an average polymerization degree of 950 and a chlorine content of 60%.

(b) The chlorinated polyvinyl chloride was foamed according to the manner of Example I(b) to obtain a foamed article. The foamed article had a density of 1.112 g/cc, a solvent remaining ratio of 0.93% and a shrinking ratio of 2%.

COMPARATIVE EXAMPLE III

Using a non-chlorinated polyvinyl chloride having an average polymerization degree of 1000, it was attemtped to obtain a foamed board according to the method described in Example I(b). The foamed board, however, was not noticeably foamed. The board had a density of 1.3 g/cc, a solvent remaining ratio of 0.98% and a shrinking ratio of 3%.

Summarizing the above results, it was confirmed that a foamed article of excellent quality can be obtained when a chlorinated polyvinyl chloride having a chlorine content of between about 60 and 75% is foamed according to the method of the present invention. A foamed article of excellent quality can not be obtained, however, with a polyvinyl chloride which is not post-chlorinated.

EXAMPLE IX (a) Using a copolymer of propylene and vinyl chloride (propylene content 3% by weight, average polymerization degree 500) instead of polyvinyl chloride as a raw material, a chlorination reaction was carried out for 10 hours in the same manner as described in Example I(a), to obtain a chlorinated copolymer of propylene and vinyl chloride having an average polymerization degree of 350 and a chlorine content of 66%.

(b) The chlorinated copolymer of propylene and vinyl chloride of (a) was foamed in the manner of Example I(b) to obtain a foamed article. The foamed article had a density of 0.363 g/cc, a solvent remaining ratio of 0.85% and a shrinking ratio of 0.43%.

From these results it was confirmed that a chlorinated copolymer can also be foamed to produce a foamed article of excellent quality according to the method of the present invention.

EXAMPLE X

To 100 parts of the chlorinated polyvinyl chloride obtained in Example I(a) were added 10 parts of a copolymer of methyl methacrylate, butadiene and styrene (Trademark Kureha BTA III-N), 10 parts of powdery calcium carbonate and 10 parts of ethyl alcohol to form a mixture, which was thoroughly mixed. The mixture was then foamed in the manner of Example I(b) to obtain a foamed article. The foamed article had a density of 0.636 g/cc, a solvent remaining ratio of 0.79% and a shrinking ratio of 0.40%.

From these results, it was confirmed that a chlorinated vinyl chloride polymer can be foamed according to the method of the present invention to produce a foamed article of excellent quality even when additives such as the copolymer described above are added to the chlorinated polymer.

EXAMPLE XI

To 100 parts of the chlorinated polyvinyl chloride obtained in Example I(a) were added 10 parts of powdery calcium carbonate, 10 parts of ethyl alcohol, 3 parts of dibutyl tin maleate and a polymeric lubricant (Trademark Wax O P) to form a mixture. The mixture was thoroughly mixed and then fed into an extruder having a ratio of length to diameter of 20 and a compression ratio of 3. The mixture was extruded through a die mounted on the extruder to form a rod having a diameter of 8 mm. The extruder was adjusted so as to maintain the feeding orifice at 40° C. and to progressively elevate the temperature along the extruder in the direction of the die with the die being maintained at 170° C. As a result, a foamed article was obtained having a density of 0.06 g/cc, a solvent remaining ratio of 0.71% and a shrinking ratio of 0.3%.

From the above results, it was confirmed that the method according to the present invention can be suitably carried out by means of an extruder.

EXAMPLE XII 1 part of ethyl alcohol was added to 100 parts of the chlorinated polyvinyl chloride obtained in Example I(a) and the resulting mixture was thoroughly mixed. The mixture was then foamed in the manner of Example I(b) to obtain a foamed article. The foamed article had a density of 0.80 g/cc, a solvent remaining ratio of 0.10% and a shrinking ratio of 0.1%.

EXAMPLE XIII 50 parts of ethyl alcohol were added to 100 parts of the chlorinated polyvinyl chloride obtained in Example I(a) to form a mixture which then thoroughly mixed. The resulting mixture was foamed in the manner of Example I(b) to obtain a foamed article. The foamed article had a density of 0.040 g/cc, a solvent remaining ratio of 1.03% and a shrinking ratio of 0.42%.

From the results of Examples XII and XIII, it was confirmed that a foamed article of excellent quality can be obtained according to the method of the present invention as long as the alcohol is contained in the chlorinated polymer in an amount of from 1 to 50 per 100 parts of the polymer.

What is claimed is:

1. A method for preparing a foam of a chlorinated polymer of vinyl chloride which comprises mixing a chlorinated polyer of vinyl chloride with from 1 to 5 parts by weight per 100 parts by weight of the chlorinated polymer of a foaming agent consisting essentially of a lower aliphatic monohydric alcohol having 1 to 5 carbon atoms, said chlorinated polymer having an average degree of polymerization of from 100 to 2000 and a chlorine content of from 60 to 70% by weight; and heating the mixture of chlorinated polymer and alcohol to a temperature and for a time sufficient to cause it to foam.

2. The method of claim 1 wherein the chlorinated polymer of vinyl chloride has a chlorine content of from 65 to 72% by weight.

3. The method of claim 1 wherein the alcohol is used in an amount of from 5 to 20 parts by weight per 100 parts by weight of the polymer.

4. The method of claim 1 wherein the chlorinated polymer of vinyl chloride has an average polymerization degree of from 300 to 1000.

5. The method of claim 1 wherein the alcohol is ethyl alcohol.

6. The method of claim 1 wherein the alcohol is methyl alcohol.

7. The method of claim 1 wherein the chlorinated polymer of vinyl chloride is chlorinated polyvinyl chloride homopolymer.

8. The method of claim 1 wherein the chlorinated polymer of vinyl chloride is a chlorinated copolymer of vinyl chloride and propylene.

* * * * *